(No Model.)

D. C. FRAZEUR.
POWER TRANSMITTING MECHANISM.

No. 487,615. Patented Dec. 6, 1892.

WITNESSES:
Fred G. Dieterich
M. D. Blondel

INVENTOR:
David C. Frazeur.
BY
ATTORNEYS

THE NORRIS PETERS CO., PHOTO-LITHO., WASHINGTON, D. C.

UNITED STATES PATENT OFFICE.

DAVID C. FRAZEUR, OF NEW MARKET, ASSIGNOR OF ONE-HALF TO JOHN A. FRECH, OF SOMERVILLE, NEW JERSEY.

POWER-TRANSMITTING MECHANISM.

SPECIFICATION forming part of Letters Patent No. 487,615, dated December 6, 1892.

Application filed March 8, 1892. Serial No. 424,242. (No model.)

*To all whom it may concern:*

Be it known that I, DAVID C. FRAZEUR, residing at New Market, in the county of Middlesex and State of New Jersey, have invented certain new and useful Improvements in Power-Transmitting Mechanism, of which the following is a specification.

My invention relates to power-transmitting mechanism; and it has for its object to provide mechanism of this character which is connected with a rotary shaft and which will serve to impart increased velocity and power thereto in a simple and effective manner.

My invention consists in the peculiar combination and novel arrangement of parts, all of which will be hereinafter fully described in the specification, and then pointed out in the claims, reference being had to the accompanying drawings, in which—

Figure 1:
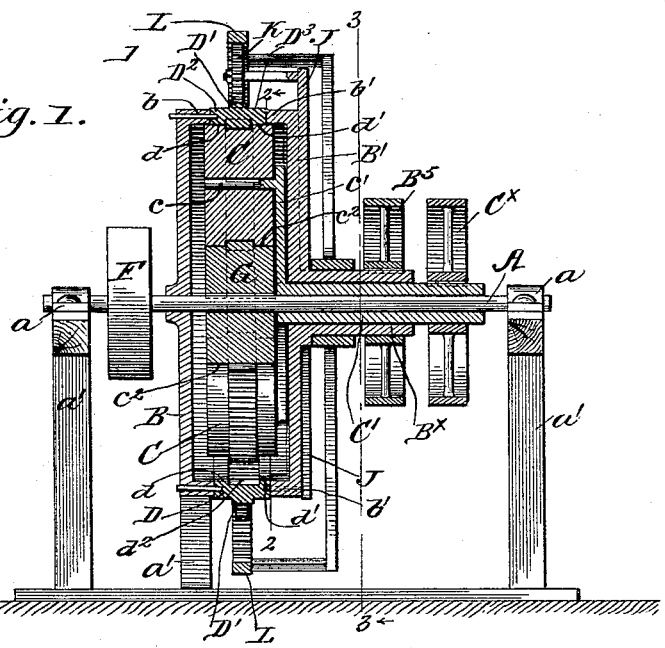
Figure 2:
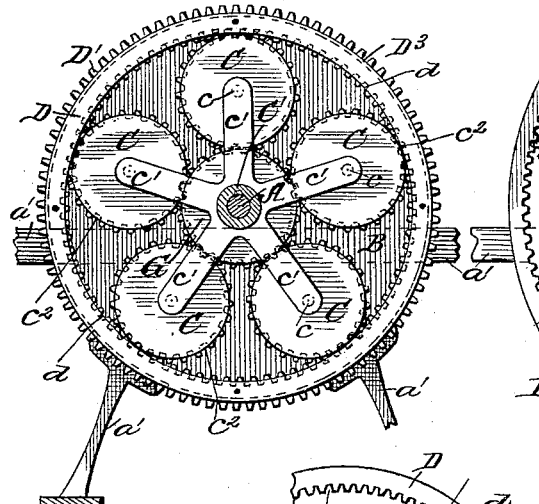
Figure 3:
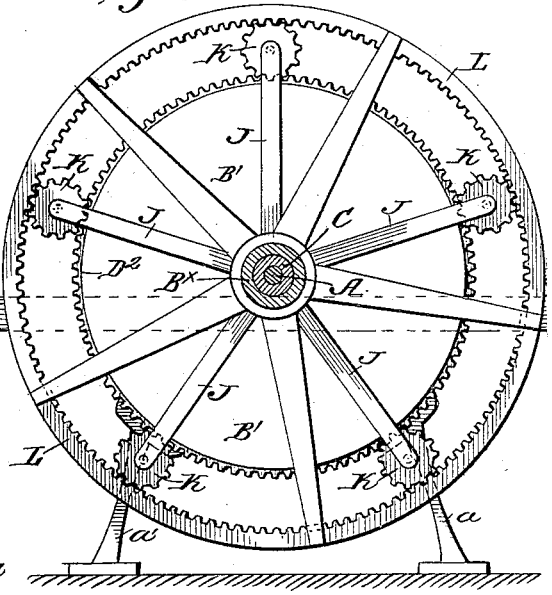
Figure 4:

Figure 1 is a vertical longitudinal section of my improved power-transmitting mechanism. Fig. 2 is a vertical cross-section taken on the line 2 2, Fig. 1. Fig. 3 is a similar view taken on the line 3 3, Fig. 1; and Fig. 4 is a detail view hereinafter referred to.

Referring to the accompanying drawings, A indicates the shaft, which is journaled in suitably-arranged bearings $a$, and B indicates a casing-section, which is secured to the frame $a'$ and through which the shaft A passes, as shown.

C represents a series of cog-wheels, each of which turns freely upon an axial pin $c$ carried by an arm $c'$ of a spider-frame, which is formed integral with a tubular shaft-section C', which is loosely mounted upon the main shaft A. As shown in Fig. 2, five cog-wheels C are provided; but I do not limit myself to such number, as a greater or less number may be used. Each of these wheels has its toothed portion projected beyond its periphery, whereby seat portions $c^2$ are provided, which portions are arranged as most clearly shown in Fig. 1, from which it will be seen that such seats have half their face portions arranged to engage the smooth portions $d\ d'$ of an internally-toothed rim D, while the other half of such seat portions project under and engage the flange $b$ of the casing-section B and the flange $b'$ of an opposite casing-section B', the construction and purpose of which will hereinafter be fully set forth. By this construction it will be noticed that the toothed rims of the wheels C engage a depressed toothed portion $d^2$ on the rim D, being guided thereby, and the flanges $b\ b'$ of the casing-sections B B'. It should be stated that the toothed rim D is arranged to be loosely or fixedly held between the sections B B', and when loosely held is caused to travel about the drive-shaft A, when motion is imparted to the tubular shaft C', such wheel having a bearing formed by its seats $d\ d'$, which rest upon the seat portions formed by the smooth peripheral faces of the gears C. The gears C are each held in mesh with a drive-wheel G, keyed to the main shaft A, as seen most clearly in Fig. 2 of the drawings.

Upon the tubular shaft C' is keyed a drive-pulley C×, to which power is transmitted from an engine or other motor, while upon the shaft A is keyed a pulley F, which travels at the increased speed, which speed varies in accordance with the adjustment of the transmitting mechanism.

When the maximum speed is desired, the toothed rim D is keyed to the inner casing-section B and becomes, as it were, a fixed rim. Now when power is applied to the pulley C× the tubular shaft carries all the toothed wheels C around the center wheel G, in gear therewith, and, being also in gear with the toothed rim D, as they are carried around such wheel G they are caused to rotate on their own axes, and in so doing rotate the wheel G, and with it the main shaft A. Now, if the gear C had no independent movement on its own axis and no other contact than with gear G such wheels would become interlocked, the gear C forming a connection between the spider-arm and the gear to make but a single revolution with the tubular shaft C'. As the gear C is, however, held in engagement with the fixed rim D, each of its cogs as it engages such toothed rim will become a temporary fixed fulcrum for the gear C, which gear as it is drawn in the direction indicated by the arrow 3 by the spider-arm will cause its diametrically-opposite edge to describe a sweep, (indicated by the dotted line X.) It will thus be seen that, while $c$ is the axis on which the gear C revolves, its contact-point with the rim D becomes its fulcrum so far as its relation to the gear G is concerned, constantly changing, as it were, the diameter of the wheel C to twice that of the wheel G, thereby transmitting at each revolution a double revolution to the wheel G, and as the relative arrangement of the diameters of the wheels G and C with the rim D are such that the gear-wheels C will make two revolutions on their own axes as they traverse the rim D once it will be apparent that the wheel G is thereby revolved four times. It will be clearly manifest that by increasing the diameter of the wheels C and enlarging the diameter of the rim D the speed of the gear-wheel G and shaft A may be increased five, six, or more times.

It will be seen that by arranging the gears as described a greatly-increased power and speed can be transmitted to the shaft A, owing to great leverage exerted from the rim D through wheel C onto the gear G, the axis $c$ acting as the lever whereby the wheel C is swung in the manner stated.

By removing the bolt which locks the rim D to the inner casing B the rim will be caused to travel in the same direction with the spider-arm. In this case the speed of the main shaft is reduced to three times that of the tubular shaft, which is accounted for from the fact that the gears C, owing to their diameters being one-third of the diameter of the rim D, will make but three revolutions as they make a complete circuit about the shaft A, and in so doing cause the gear G to revolve three times. It should be stated, however, that the rim D, which is carried by the tubular shaft C' and the gears C, will as the shaft C' rotates once rotate one and one-third times. This is accounted for by the fact that while the spider-arm and its gear C in its sweep about the shaft A carries the rim with it a secondary motion is imparted thereto by the rotation of the gear C on its own axis, which movement is added to the primary movement and produces the increased speed stated. It will be noticed by reference to Fig. 2 that the upper peripheral face of the rim D has a central gear-rim D' and adjacent smooth faces $D^2 D^3$, such faces being arranged as stated, whereby such rim is formed into a power-pulley. By locking the rim D to the outer or movable casing-section B' and applying power to the said rim such power is transmitted through the gears C on the spider-arms of the tubular shaft C' (which then becomes a rigid or idle member) to the gear G, the speed of such gear being three times that of the rim D.

To multiply the speed, the tubular shaft $B^\times$ on the section B' has spider-arms J, which project up on one side of the section B', as shown most clearly in Fig. 3, their upper ends carrying gears K, which mesh with the peripheral gear-section of the rim D and with the internal gear-face of a second rim member L, which is loosely journaled on the main shaft or other suitable bearing, the outer face of which is arranged to receive a drive-belt M, as shown. It will thus be seen that when the rim is rotated by the tubular shaft C' in the manner before stated power is transmitted therefrom to the second rim L.

When the rim is used as a power-wheel, a crank or treadle can be attached to its outer face in any desired manner, which will serve as a convenient connection to impart motion to a crank or other power shaft.

My improved mechanism is capable of many adjustments, and the power from the main or first rim can be readily transferred to a number of other rims, the second rim being geared with the third in the same manner that the first is geared with the second. When the rim D is fixedly held to the inner casing B by bolting the tubular shaft of the outer casing B' to the tubular shaft C', the casing B' and its spider-arm will be caused to travel on the fixed gear-rim D and such gears will impart a movement to the second rim L in the same direction, but at an increased speed.

It will be understood that the several parts may be so adjusted that the rims D and L may be moved together in the same direction at the same speed in opposite directions and at variable speeds. The shaft A can be caused to revolve in either direction by applying the drive-belt to either the pulley $C^\times$ or the pulley $B^5$ on the shaft $B^\times$.

Having thus described my invention, what I claim, and desire to secure by Letters Patent, is—

1. The combination, with a supporting-frame, a shaft journaled therein, and a drive-wheel G, fixed thereon, of a tubular shaft mounted on the main shaft, having one or more toothed wheels C, arranged to mesh with the teeth on and traverse the periphery of the wheel G, and an internally-toothed rim mounted upon the peripheral edges of the wheels C and carried thereby, substantially as and for the purpose described.

2. The combination, with the main shaft A, a drive-gear G, fixed thereto, the casing-sections B and B', having inwardly-projecting flanges, the tubular shaft C', mounted on the shaft A, having one or more radial arms, and the gear-wheels C, journaled thereon and held to traverse the periphery of said wheel G, said wheels having laterally-extending smooth face portions, of the rim D, having an internally-depressed toothed section adapted to mesh with the outer faces of the wheel C and smooth seat portions adapted to seat upon the smooth faces of the gears, as and for the purpose described.

3. The combination, with the shaft A, the fixed gear G, and the tubular shaft C', having a radial arm or arms provided with gears traversing the wheels G, of the casing-sections B B', the internally and externally toothed rim D, its inner teeth held in engagement with the wheels C, the section B fixedly held, the section B' movable on the shaft A and provided with one or more radial arms having gears K, held to mesh with the outer teeth of the rim D, and the second internally-toothed rim L, independently mounted and held to mesh with the gears K, all arranged substantially as and for the purpose described.

4. The combination, with the fixed casing-section B, the shaft A, mounted therein, and a fixed gear G on said shaft, of the tubular shaft C', mounted on the shaft A and carrying one or more gears C, arranged to traverse the gear G, the casing-section B', loosely held on the shaft C', the rim D, having an internally-toothed face held to mesh with the peripheral faces of the gear C, and means for locking such rim to the fixed inner or the loose outer casing-section, substantially as and for the purpose described.

5. The combination, with the shaft A and the gear G, the fixed casing-section B, the tubular shaft C', having spider-arms, gears C, mounted on such arms and held to traverse the gear G, and the rim D, having its outer face formed with a central toothed periphery and adjacent belt-receiving portions, its inner face having gears held for engagement with the gears C, of the casing-section B', having a tubular shaft portion fitting loosely on the shaft C' and spider-arms carrying independently-journaled gears K, said gears held to engage the outer toothed portion of the rim D, the rim L, mounted to engage the gears K, and means for locking the rim D to the section B or B' and the tubular shaft $B^x$ to the shaft C', all arranged substantially as shown and described.

DAVID C. FRAZEUR.

Witnesses:
FRED G. DIETERICH,
SOLON C. KEMON.